US012456807B2

(12) United States Patent
Singh et al.

(10) Patent No.: US 12,456,807 B2
(45) Date of Patent: Oct. 28, 2025

(54) MULTIBAND REFLECTIVE SURFACE WITH BEAM STEERING AND BEAM SPLITTING FUNCTIONALITY

(71) Applicant: Dell Products L.P., Round Rock, TX (US)

(72) Inventors: Tejinder Singh, Kanata (CA); Kan Wang, Ottawa (CA); Navjot Kaur Khaira, Kanata (CA); Morris Repeta, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 18/403,467

(22) Filed: Jan. 3, 2024

(65) Prior Publication Data

US 2025/0219290 A1 Jul. 3, 2025

(51) Int. Cl.
*H01Q 3/46* (2006.01)
*H01Q 15/00* (2006.01)

(52) U.S. Cl.
CPC ........... *H01Q 3/46* (2013.01); *H01Q 15/0033* (2013.01)

(58) Field of Classification Search
CPC ............................. H01Q 3/46; H01Q 15/0033
See application file for complete search history.

(56) References Cited

U.S. PATENT DOCUMENTS 7,319,429 B2 * 1/2008 Chang ................ H01Q 15/0006 343/700 MS
11,575,214 B2 * 2/2023 Hand ....................... H01Q 3/46

FOREIGN PATENT DOCUMENTS

CN 108767493 11/2018
CN 110011058 7/2019
CN 106505316 B * 6/2021 ............... H01Q 1/52
CN 114883808 8/2022
(Continued)

OTHER PUBLICATIONS

Quevedo-Teruel, "Roadmap on metasurfaces," Journal of Optics, vol. 21, No. 7, pp. 073002, Jul. 2019. 45 pages.
(Continued)

*Primary Examiner* — Seung H Lee
(74) *Attorney, Agent, or Firm* — Amin, Turocy & Watson, LLP

(57) ABSTRACT

The technology described herein is directed towards a multiband unit cell that is part of a reflective surface that can reflect different specific frequencies of impinging electromagnetic waves. The unit cells can have different phase profiles to facilitate beam steering and/or beam splitting functionality, independently for each specific frequency. The multiband unit cell can be a dual-band unit cell based on a straightforward unit-cell design, e.g., using diagonally arranged ring resonators as sub-cells of a supercell. Alternative design variations are also described to accommodate multi-frequency (greater than two frequency) applications. In one example implementation, the metasurface is constructed as a low-profile dual-band reflective surface with beam-steering and/or beam-splitting capabilities, e.g., utilizing only a single unit cell metal layer above a substrate. This enables precise control and manipulation of an antenna's radiation pattern, providing enhanced coverage for both frequency bands while keeping the fabrication/manufacturing costs relatively low.

20 Claims, 14 Drawing Sheets

(56) References Cited

FOREIGN PATENT DOCUMENTS

| | | |
|---|---|---|
| EP | 4395075 | 7/2024 |
| JP | 7371819 | 10/2023 |
| WO | 2022/229767 | 11/2022 |

OTHER PUBLICATIONS

Basharat, et al., "Reconfigurable Intelligent Surfaces: Potentials, Applications, and Challenges for 6G Wireless Networks," in IEEE Wireless Commun., vol. 28, No. 6, pp. 184-191, Dec. 2021, doi: 10.1109/MWC.011.2100016.

Chen, et al., "Reconfigurable Intelligent Surfaces for 6G IoT Wireless Positioning: A Contemporary Survey," IEEE Internet of Things J., vol. 9, No. 23, pp. 23570-23582, 1 Dec. 1, 2022, doi: 10.1109/JIOT.2022.3203890.

Basari, et al., "Field Measurement on Simple Vehicle-Mounted Antenna System Using a Geostationary Satellite," in IEEE Transactions on Vehicular Technology, vol. 59, No. 9, pp. 4248-4255, Nov. 2010, doi: 10.1109/TVT.2010.2066997.

Zhu, et al., "Dual-Band Dual Circularly Polarized Antenna Array Using FSS-Integrated Polarization Rotation AMC Ground for Vehicle Satellite Communications," in IEEE Transactions on Vehicular Technology, vol. 68, No. 11, pp. 10742-10751, Nov. 2019, doi: 10.1109/TVT.2019.2938266.

Baladi, et al. "Dual-Band Circularly Polarized Fully Reconfigurable Reflectarray Antenna for Satellite Applications in the Ku-Band," in IEEE Transactions on Antennas and Propagation, vol. 69, No. 12, pp. 8387-8396, Dec. 2021, doi: 10.1109/TAP.2021.3090577.

Li, et al., "A Dual-Passband Frequency Selective Surface for 5G Communication," in IEEE Antennas and Wireless Propagation Letters, vol. 18, No. 12, pp. 2597-2601, Dec. 2019, doi: 10.1109/LAWP.2019.2944936.

Jilani, et al., "Millimeter-Wave Liquid Crystal Polymer Based Conformal Antenna Array for 5G Applications," in IEEE Antennas and Wireless Propagation Letters, vol. 18, No. 1, pp. 84-88, Jan. 2019, doi: 10.1109/LAWP.2018.2881303.

Jilani, et al., "A Multiband Millimeter-Wave 2-D Array Based on Enhanced Franklin Antenna for 5G Wireless Systems," in IEEE Antennas and Wireless Propagation Letters, vol. 16, pp. 2983-2986, 2017, doi: 10.1109/LAWP.2017.2756560.

Nayeri, et al., "Reflectarray Antennas: Theory, Designs and Applications," Hoboken: Wiley-IEEE Press, 2018, Online ISBN: 9781118846728., pp. 1-410.

Nayeri, et al., "Reflectarray Antennas: Theory, Designs and Applications," Hoboken: Wiley-IEEE Press, 2018, Online ISBN: 9781118846728., pp. 411-820.

Yu, et al., "Experimental demonstration of a single layer tri-band circularly polarized reflectarray," 2010 IEEE Antennas and Propagation Society International Symposium, Toronto, ON, Canada, 2010, pp. 1-4, doi: 10.1109/APS.2010.5562303.

Bhattacharyya, "Phased Array Antennas Floquet Analysis, Synthesis, BFNs, and Active Array System," Hoboken: Wiley-IEEE Press, 2020.

Huang, et al., "Reflectarray Antennas, by Institute of Electrical and Electronics Engineers," John Wiley & Sons, Ltd, 2008.

Balling, et al., "Multiple contoured beam reflector antenna systems," IEEE Antennas and Propagation Society International Symposium, Michigan, USA, Jun. 28-Jul. 2, 1993.

Schulwitz, et al., "A compact dual-polarized multibeam phasedarray architecture for millimeter-wave radar," IEEE Trans. Microw. Theory Tech., vol. 53, No. 11, pp. 3588-3594, Nov. 2005.

Lanteri, et al., "Four-beam reflectarray antenna for mm-waves: design and tests in far-field and near-field ranges," EuCAP 2009, Berlin, Germany, pp. 2532-2535, Mar. 2009.

Nayeri, "Advanced Design Methodologies and Novel Applications of Reflectarray Antennas," Ph.D. dissertation, Dept. Eng. Sci., Univ. of Mississippi, Jul. 2012.

Nayeri, et al., "Single-feed multi-beam reflectarray antennas," IEEE Antennas and Propagation Society International Symposium, Toronto, Canada, Jul. 2010.

Singh et al. "Grating Lobe-Based Metasurfaces With Beam-Splitting Capability" U.S. Appl. No. 18/539,370, filed Dec. 14, 2023, 38 pages.

International Search Report and Written Opinion for PCT Application No. PCT/US2024/013713 mailed Oct. 9, 2024, 15 pages.

International Search Report and Written Opinion for PCT Application No. PCT/US2024/013733 mailed Sep. 13, 2024, 14 pages.

Ahmed Foez et al: "Highly Transparent Fully Metallic 1-Bit Coding Metasurfaces for Near-Field Transformation", 2022 16th EUCAP, European Association for Antennas and Propagation, Mar. 27, 2022 (Mar. 27, 2022), pp. 1-4.

Diaz-Rubio A et al: "Macroscopic Modeling of Anomalously Reflecting Metasurfaces: Angular Response and Far-Field Scattering", arxiv.org, Cornell University Library, Mar. 9, 2021 {Mar. 9, 2021}, 13 pages.

* cited by examiner

MULTIBAND REFLECTIVE SURFACE WITH BEAM STEERING AND BEAM SPLITTING FUNCTIONALITY

BACKGROUND

Dual-band communication refers to communication using devices or systems that can operate in two distinct frequency bands. Dual-band communication is desirable in many scenarios, particularly in view of the growing demand for efficient and reliable wireless connectivity in a rapidly evolving technological landscape.

Dual-band technology offer several advantages compared to single band technology, including spectrum efficiency, and improved coverage and range; (lower frequency signals provide more coverage but carry less information, whereas higher frequency signals provide less coverage, but carry more information via a faster connection speed). Other advantages include enhanced capacity and throughput by utilizing two frequency bands simultaneously when possible, flexibility and adaptability, resilience and redundancy by switching bands to circumvent interference or other signal degradation, and future proofing as technology standards and spectrum allocations evolve over time, because dual band can support different wireless protocols and standards. However, existing dual-band antenna technologies face several challenges that hinder their widespread adoption.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
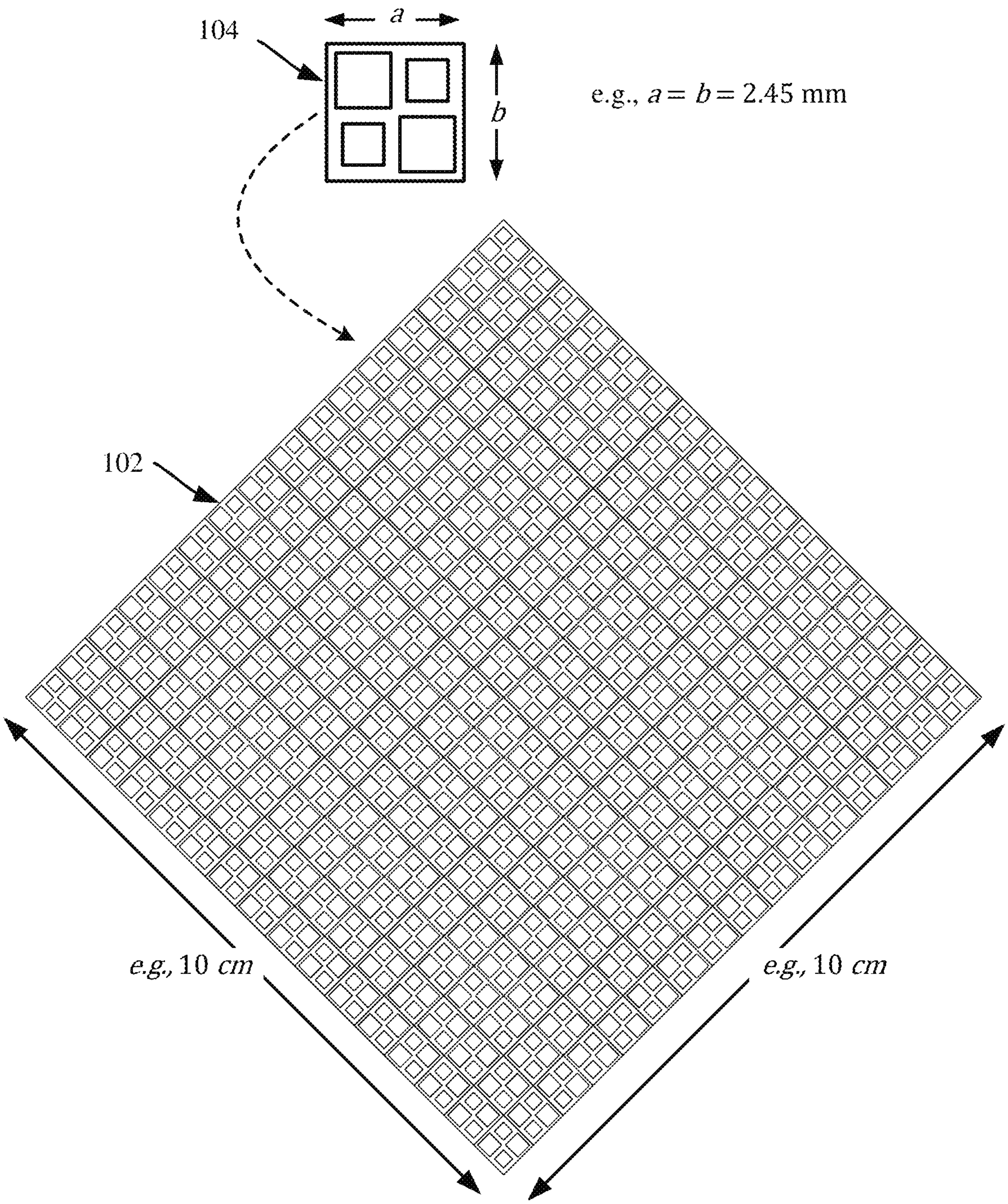
FIG. 1 is a two-dimensional (2D) representation of an example reflective metasurface of unit cells, in accordance with various example embodiments and implementations of the subject disclosure.

While there are some benefits to using dual-band antenna, existing dual-band antenna technologies face several challenges that hinder their widespread adoption. In this regard, traditional parabolic antennas and phased-array antennas suffer from high costs, complexity in design and implementation, and occupy large physical footprints. These factors make them less practical for certain applications, especially those with space and/or budget constraints. In sum, there is a need for efficient, reliable, and future-ready wireless connectivity that can adapt to diverse scenarios, which dual-band technology often can provide.

Various example embodiments of the technology described herein are generally directed towards a multiband unit cell design and implementation, and more particularly, a unit cell that is part of a reflective surface that can reflect different specific frequencies of electromagnetic waves impinging on the reflective surface. The unit cells can have different phase profiles to accomplish beam steering and/or beam splitting functionality, independently for each specific frequency. The technology described herein facilitates a practical reflective surface for wireless communication frequencies currently in use, as well as for wireless communication frequencies planned for advanced networks beyond 5G.

In one implementation, the multiband unit cell is a dual-band unit cell that, along with other unit cells, forms a dual-band reflective surface, e.g., a metasurface made from metamaterials. This implementation is based on a straight-forward unit-cell design specifically tailored for dual-band applications. For example, the design can be based using fundamental and well-understood geometry square ring resonators as sub-cells, arranged diagonally in a supercell. The unit cell design can optimize the impedance matching and radiation characteristics at both specified frequency bands (relatively narrow bands), ensuring efficient operation across the desired frequency ranges.

Alternative design variations are also described to accommodate requests or requirements of multi-frequency applications. The metasurface can be designed for such different frequency bands, facilitating seamless integration into various wireless communication systems.

In one example implementation, the metasurface is constructed as a low-profile surface with advanced beam-steering and/or beam-splitting capabilities, e.g., utilizing only a single metal layer above a substrate. This enables precise control and manipulation of an antenna's radiation pattern, providing enhanced coverage and signal focusing on both frequency bands while keeping the fabrication/manufacturing costs ultra-low.

It should be understood that any of the examples herein are non-limiting. Thus, any of the embodiments, aspects, concepts, structures, functionalities or examples described herein are non-limiting, and the technology may be used in various ways that provide benefits and advantages in communications and computing in general. It also should be noted that terms used herein, such as "optimize" or "optimal" and the like only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state.

The following detailed description is merely illustrative and is not intended to limit embodiments and/or application or uses of embodiments. Furthermore, there is no intention to be bound by any expressed or implied information presented in the preceding sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it is to be understood that the present disclosure will be described in terms of a given illustrative architecture; however, other architectures, structures, substrate materials and process features, and steps can be varied within the scope of the present disclosure.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there are no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

Example embodiments of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a generalized representation of an example reflective (or transmissive) surface 102 including a group of unit cells (comprising resonating elements). The surface 102 can be static, meaning that the surface once configured remains unchanged, or can be made of elements that can be dynamically reconfigured with some amount of power applied. For purposes of the examples herein, a static surface is generally described. As can be seen, example dimensions for the static surface 102 are 10 cm×10 cm.

One unit cell 104 of the group of unit cells of the static surface is shown enlarged relative to the depicted example static surface 102. Example period dimensions for a unit cell 104 are 2.45 mm×2.45 mm, generally square in shape in this example implementation. Note that the square shape is only one arbitrary, nonlimiting example, as any shape can be used as long as the shape is a resonator that resonates at the desired design frequency. Further note that while 16×16 unit cells are shown, a 10 cm×10 cm reflective surface generally would have 40×40 unit cells, and thus the surface 102 depicted in FIG. 1 can be considered a portion of a surface with more unit cells. Thus, the numbers of (unit cells) and their sizes relative to the surface (which also can be of different dimensions) are not intended to be representative of actual numbers and sizes, and are only depicted for purposes of explanation and not intended to convey relative numbers or sizes. Indeed, in any of the drawing figures herein, the relative sizes, data results shown in the graphs or anything else shown are only presented for purposes of explanation.

Figure 2:
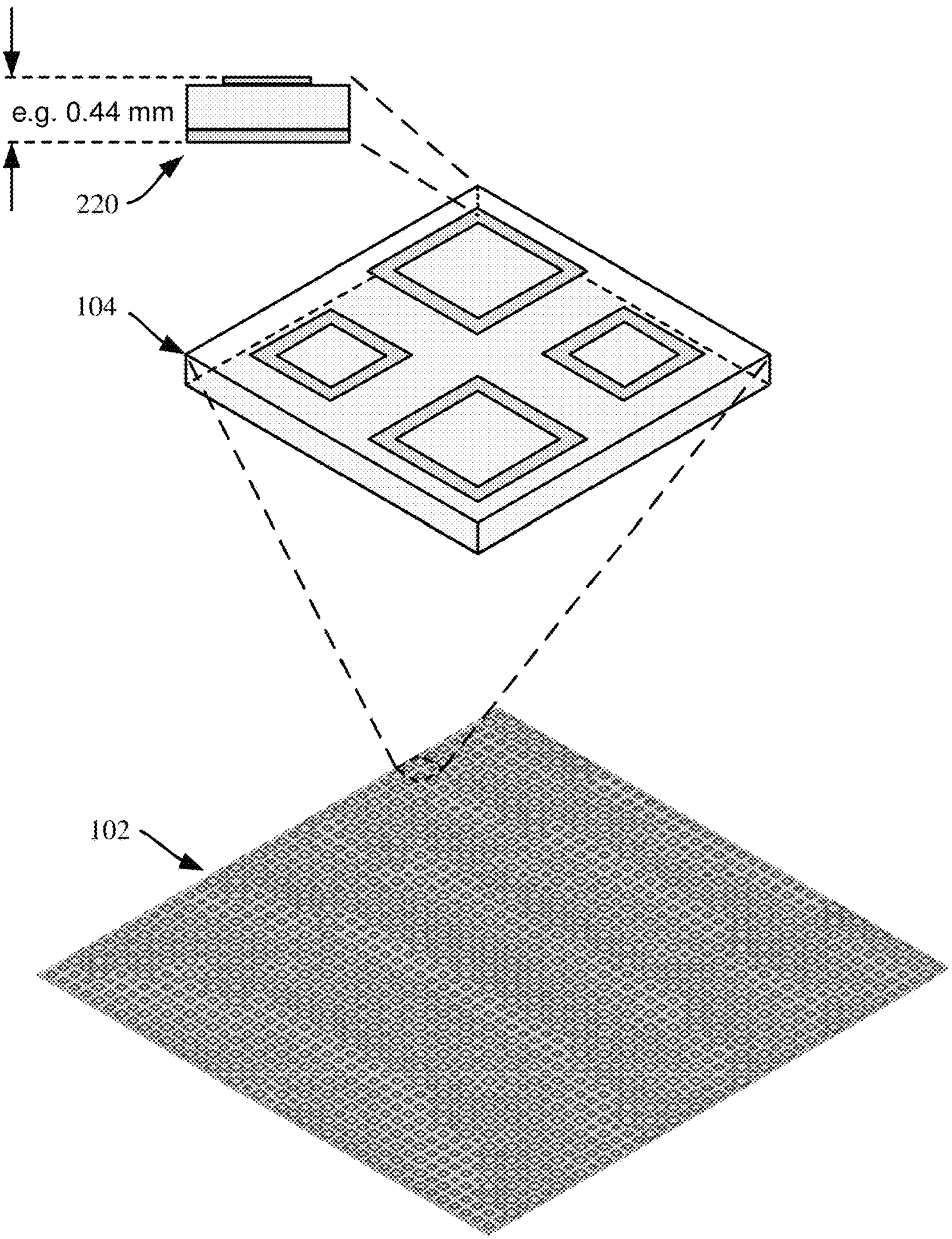
FIG. 2 is a three-dimensional (3D) representation of an example reflective metasurface of unit cells, along with a cross-sectional view of part of a dual-band unit cell, in accordance with various example embodiments and implementations of the subject disclosure.

FIG. 2 shows perspective views of the surface 102 and the enlarged unit cell 104. The thickness of the unit cell 104 is shown by the side/cross-sectional view 220, e.g., 0.44 mm in this example. In the side view 220, the darker rectangles represent metallic (copper) above and below a substrate (the lighter rectangle). In the perspective view, the darker rectangles of the unit cell 104 represent metallic (copper) above the substrate (the lighter rectangular cuboid); it is understood that the unit cell 104 has a similar metallic bottom layer.

Figure 3:
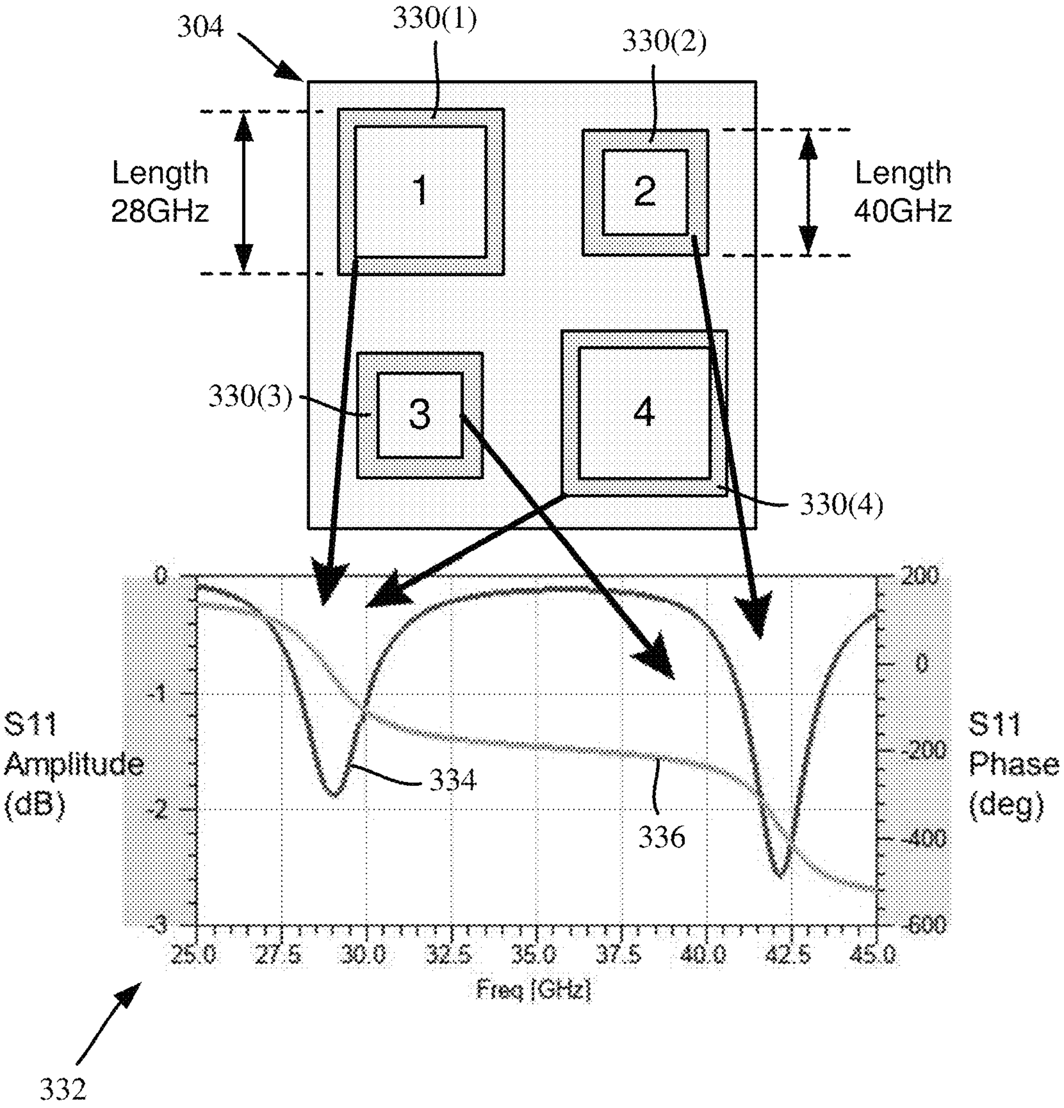
FIG. 3 is a representation of an example dual-band unit-cell design showing the reflection coefficient (S11) amplitude with nominal values over various frequencies, in accordance with various example embodiments and implementations of the subject disclosure.

FIG. 3 shows one example unit-cell design 304 for implementing a dual-band metasurface using square rings 330(1)-330(4) as resonators. As can be seen, the square ring resonators 330(1) and 330(4) for one design frequency, 28 GHz, are diagonally arranged relative to one another, while the square ring resonators 330(2) and 330(3) for the other design frequency, 40 GHz, are similarly diagonally arranged relative to one another. In this way, two resonating frequencies are supported independently by the unit cell design. The graph 332 shows the reflection coefficient S11 amplitude 334 and S11 phase 336 resulting from the example reflective unit-cell design 304.

Figure 4:
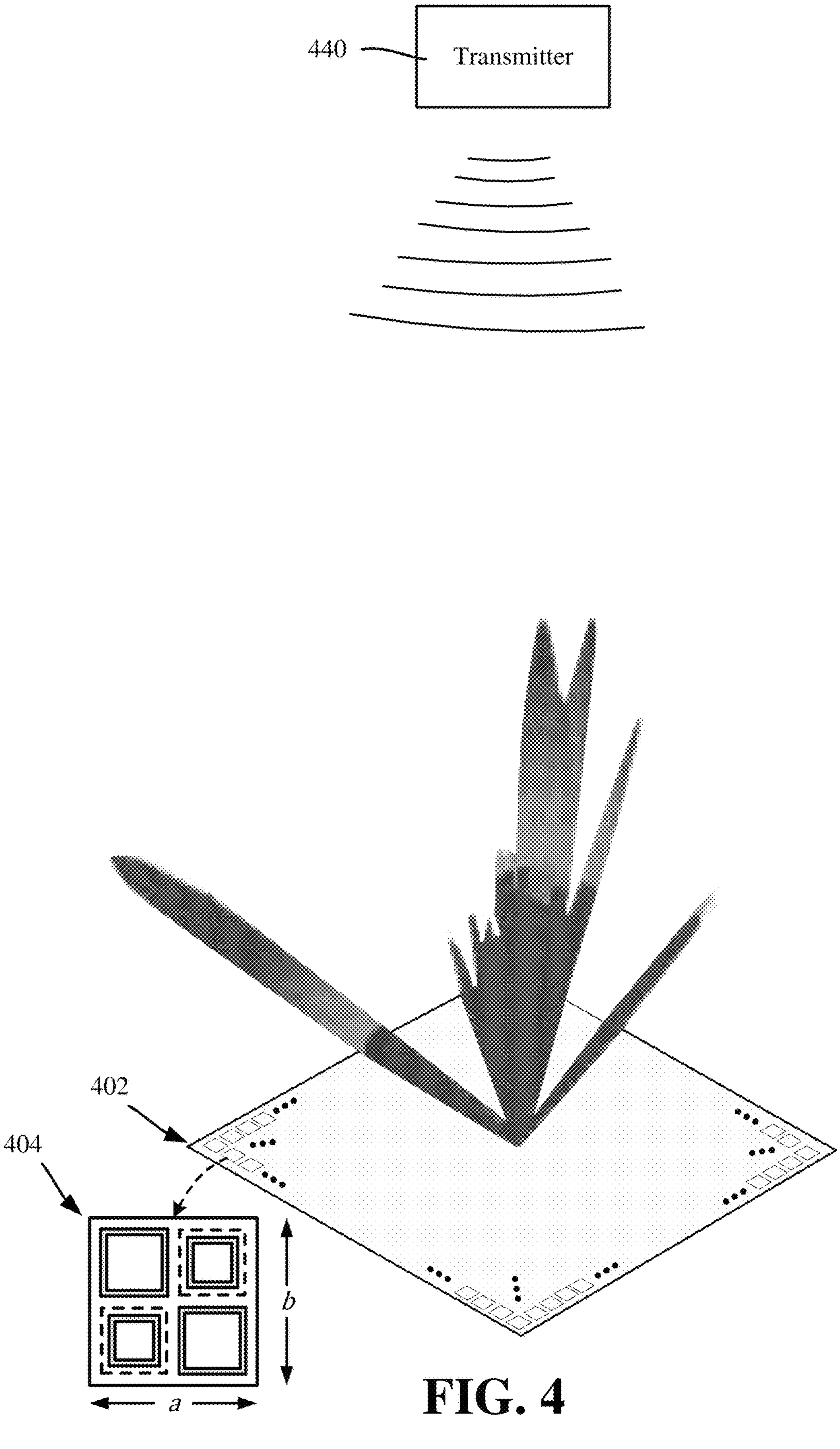
FIG. 4 is an example representation of beam splitting by a metasurface designed and implemented based on the technology described herein, in accordance with various example embodiments and implementations of the subject disclosure.

FIG. 4 shows a similar (enlarged) unit cell 404 that is part of a reflective metasurface 402 that is configured with other unit cells distributed over the surface (only some of which are depicted) so as to operate as a beam-splitting device with respect to one of the two frequencies. The higher frequency corresponds to the dashed blocks surrounding the square ring resonators in the depicted unit cell 404; e.g., the larger squares are for 28 GHZ, the smaller squares are for 40 GHz. The multibeam metasurface 402 receives the impinging waves from the transmitter 440 location, e.g., which is sufficiently distant so that the transmitted frequencies are received as far-field waves.

Figure 5A:
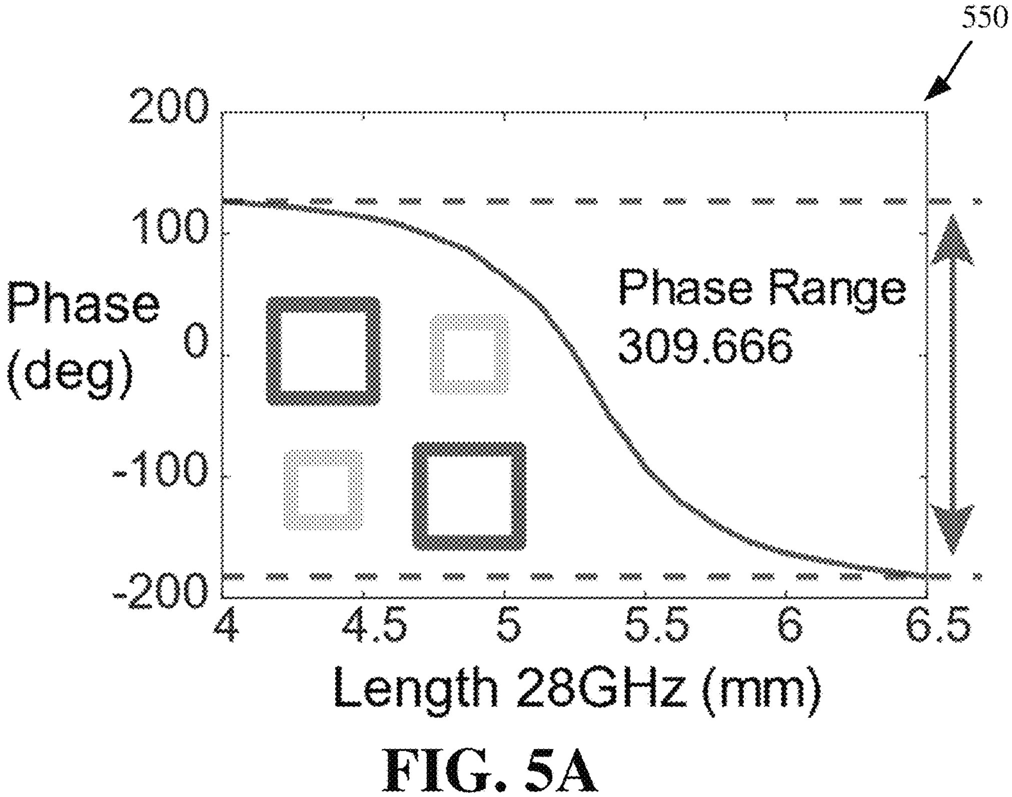
FIGS. 5A and 5B are example representations of phase profiles with a variation on the square ring lengths for 28 GHz and 40 GHz frequencies, respectively, in accordance with various example embodiments and implementations of the subject disclosure.
Figure 5B:
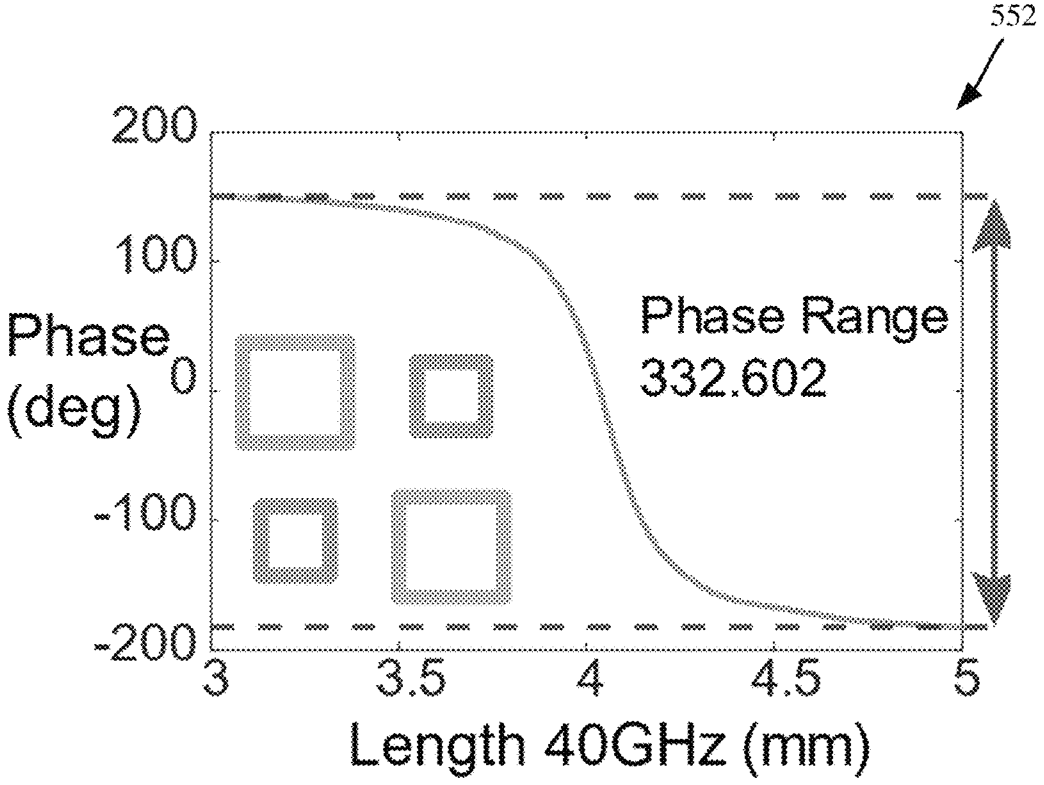

FIG. 5A is an example of a graph 550 showing how the square ring length is a variable for tuning the phase profile for the 28 GHz frequency. FIG. 5B similarly shows an example graph 552 of how the length variable of the unit-cell aperture can tune the phase profile with a 40 GHz frequency. This results in dual-band behavior with the strongest magnitude and phase variation on the two designed frequencies (as shown in FIG. 3). As shown in FIGS. 5A and 5B, respectively, a sweep performed on the square ring length results in a phase range of 310 degrees at 28 GHz, and 332 degrees at 40 GHz; (in general, a phase range of 310 degrees or above is normally sufficient for the design).

Figure 6:
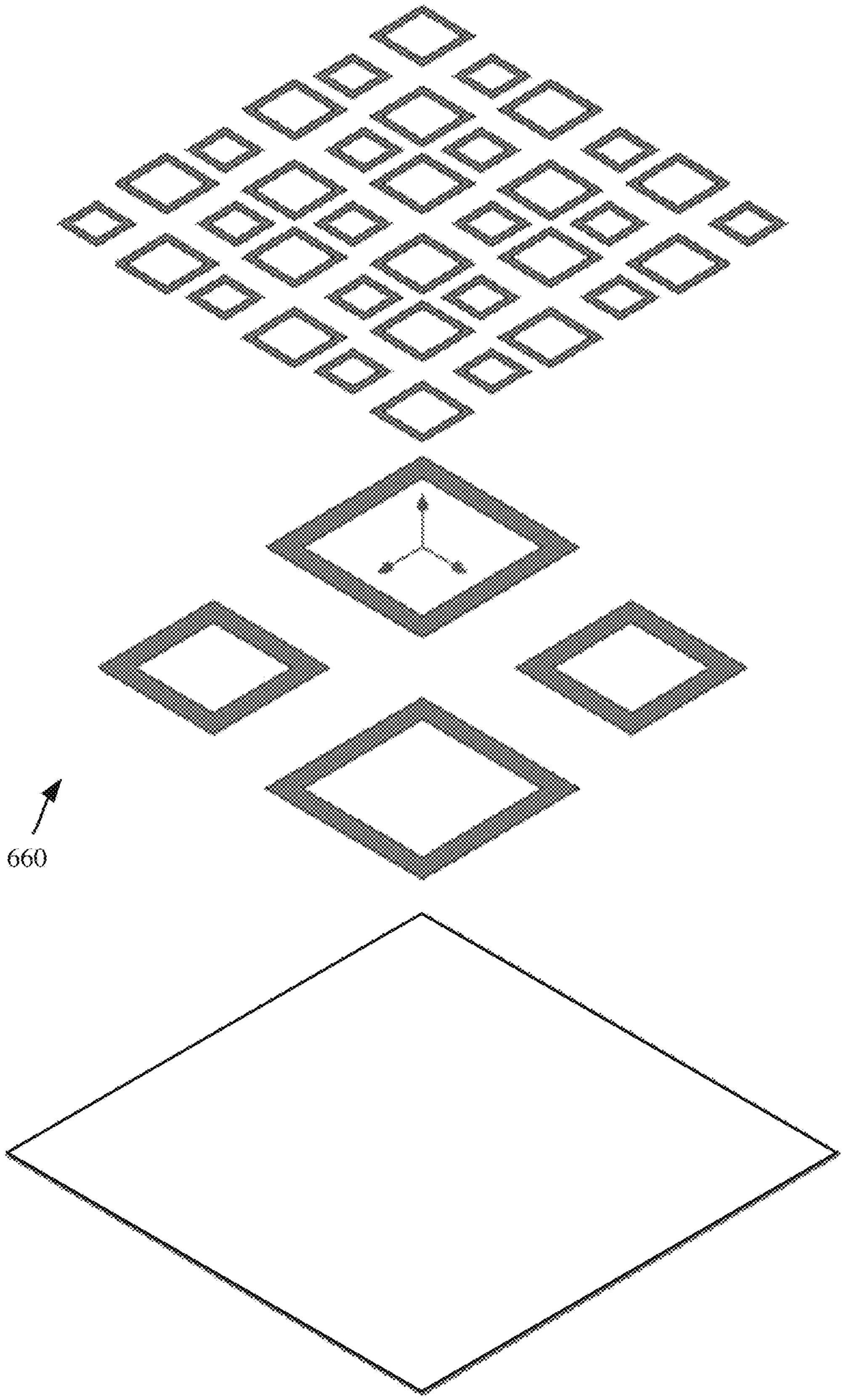
FIG. 6 is an example exploded view representation of a multiband (four band) unit cell design, in accordance with various example embodiments and implementations of the subject disclosure.
Figure 7A:
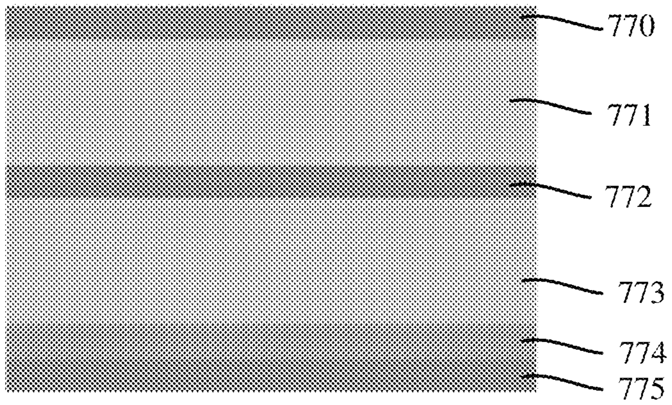
FIG. 7A is an example cross-sectional view representation of a multiband (four band) design of part of a unit cell, in accordance with various example embodiments and implementations of the subject disclosure.

Instead of a dual-band surface, the general design described herein can be further developed into a multi-band unit cell 660 (FIG. 6, exploded perspective view). In one implementation, the multi-band design is accomplished by using a multi-layer design (FIG. 7A). In the cross-sectional view of FIG. 7A, a first metallic (e.g., copper) first layer 770 is separated by an insulator (e.g., foam) 771 or the like from a second metallic (e.g., copper) layer 773. The second metallic layer 773 is separated by an insulator 774 atop a substrate 775. A bottom metallic (e.g., copper) layer 776 is the ground plane. The pattern of the conductors in the multiple layers is such that they do not interfere with each other's reflected resonating frequencies. Although not explicitly shown, it is understood that more than two layers of resonators may be used in still other designs.

Figure 7B:
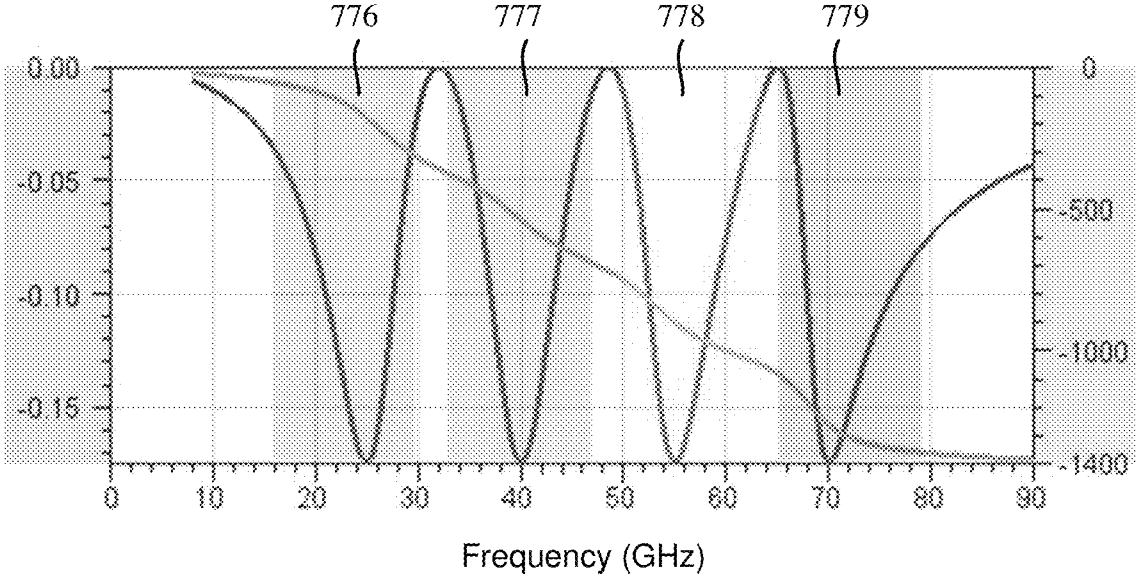
FIG. 7B is an example graphical representation of a simulation result showing coverage via the four band design of FIG. 6, in accordance with various example embodiments and implementations of the subject disclosure.

The unit cell results simulated are shown in FIG. 7B. The simulation result demonstrates four separate resonating frequencies from 25 GHz to 70 GHz as indicated by the different bands 776-779.

Figure 8:
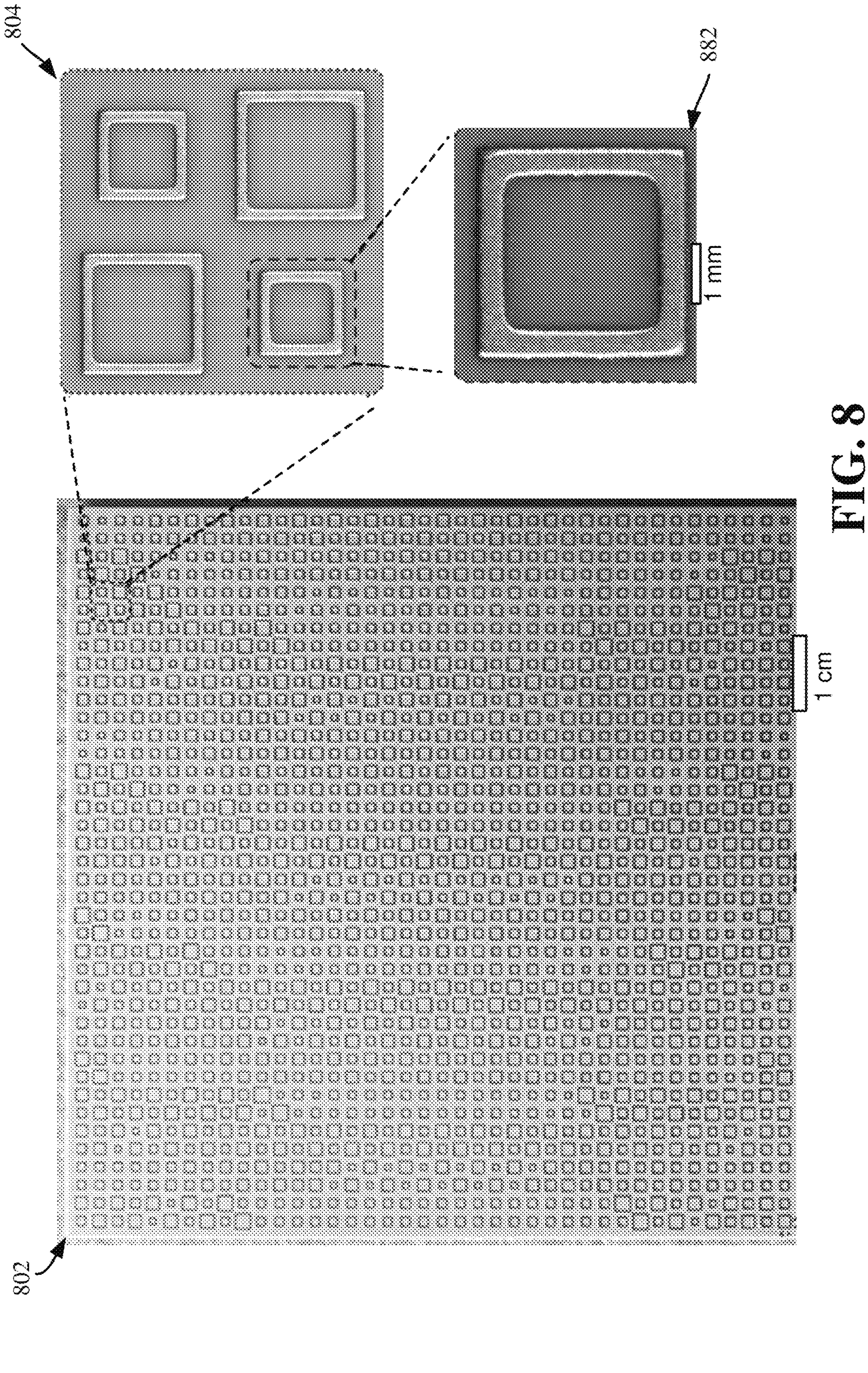
FIG. 8 shows images of an example dual-band metasurface implementation constructed with a group of unit cells as described herein, in accordance with various example embodiments and implementations of the subject disclosure.

Returning to an example low-profile single unit cell layer surface and design/layout approach with beam-steering and beam-splitting functionality, FIG. 8 shows images of an actual fabricated metasurface 802, highlighting the single layer supercell design 804 and dimensions by the 1 cm and 1 mm scale bars, including one of the square rings 882 in the zoomed-in views.

The unit cells can be assembled into surfaces using the phase formulation (reflectarray analysis):

$$\phi_{RA} = k_0(R_i - \sin\theta_0\,(x_i \cos\varphi_o + y_i \sin\varphi_o)) + \phi_0$$

where RA is the phase compensation on each unit-cell. The first term $R_i$ corresponds to the path difference and the second term corresponds to the beam steering angle. This gives a designer full control over the beam-steering direction.

Figure 9A:
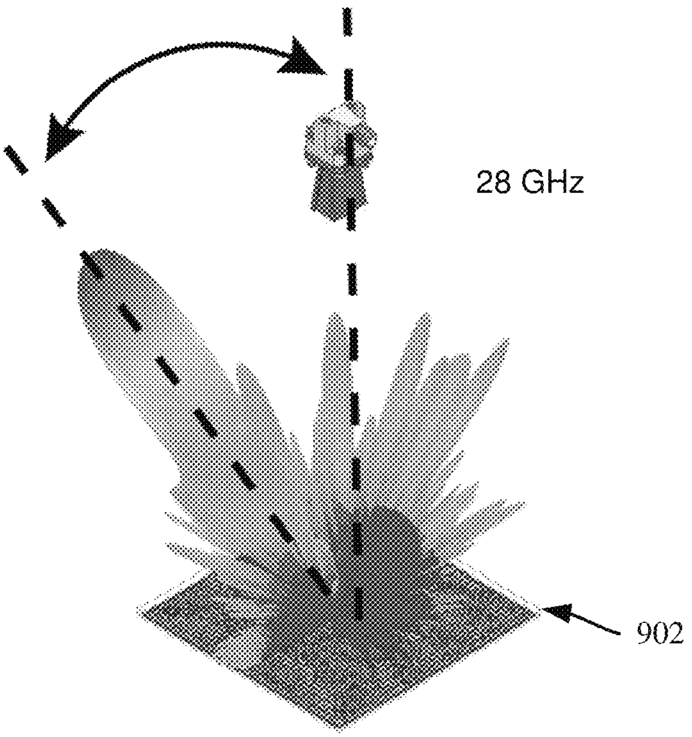
FIGS. 9A and 9B show 3D examples of (simulated) radiation patterns at 28 GHz for two different dual-band reflective surfaces, respectively, in accordance with various example embodiments and implementations of the subject disclosure.
Figure 10A:
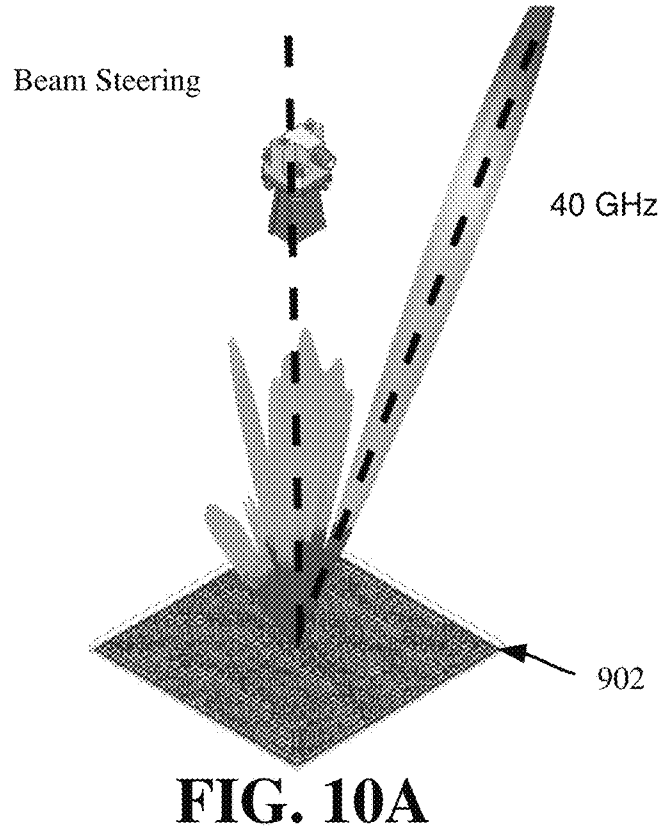
FIGS. 10A and 10B show 3D examples of (simulated) radiation patterns at 40 GHz for the two different dual-band reflective surfaces (of FIGS. 9A and 9B), respectively, in accordance with various example embodiments and implementations of the subject disclosure.
Figure 10B:
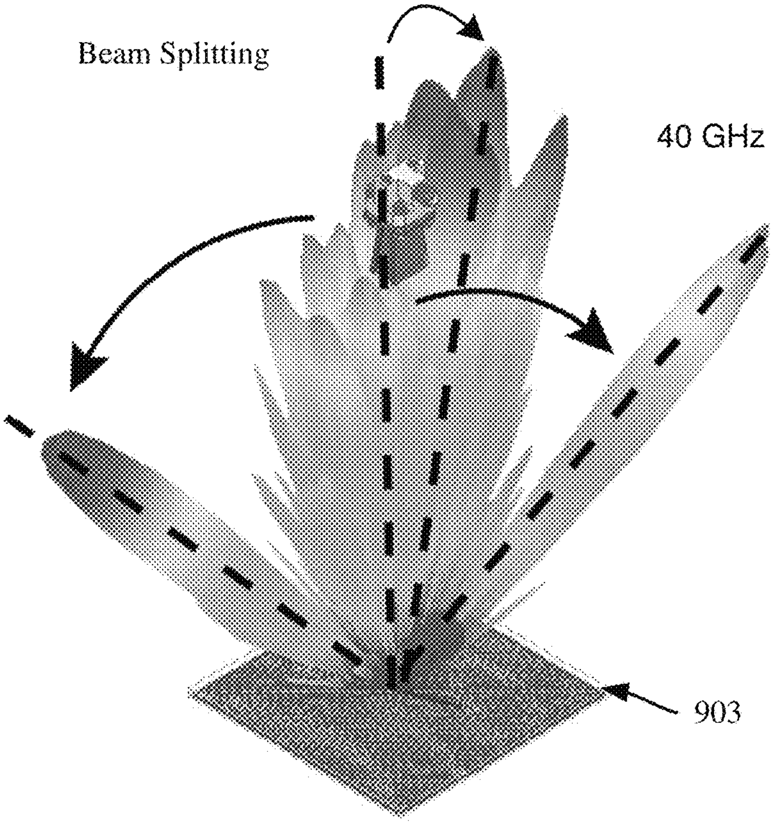

The 3D far-field radiation pattern results for two such (simulated) static reflective surfaces is shown in FIGS. 9A (one surface design 902) and 9B (a different surface design 903) for an impinging electromagnetic wave with a 28 GHz frequency. Similarly, the 3D radiation patterns for the same two surface designs 902 and 903 are shown in FIGS. 10A and 10B, respectively, for an impinging electromagnetic wave with a 40 GHz frequency.

Figure 9B:
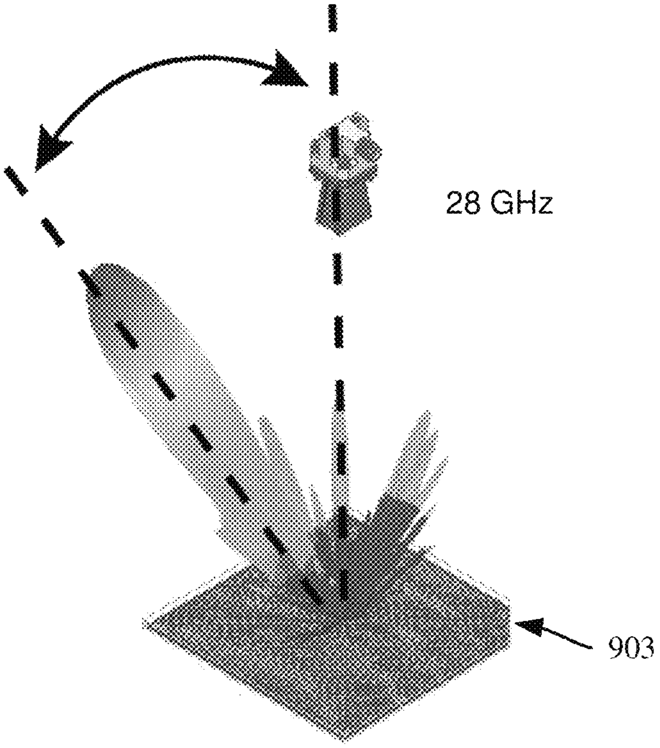
Figure 11:
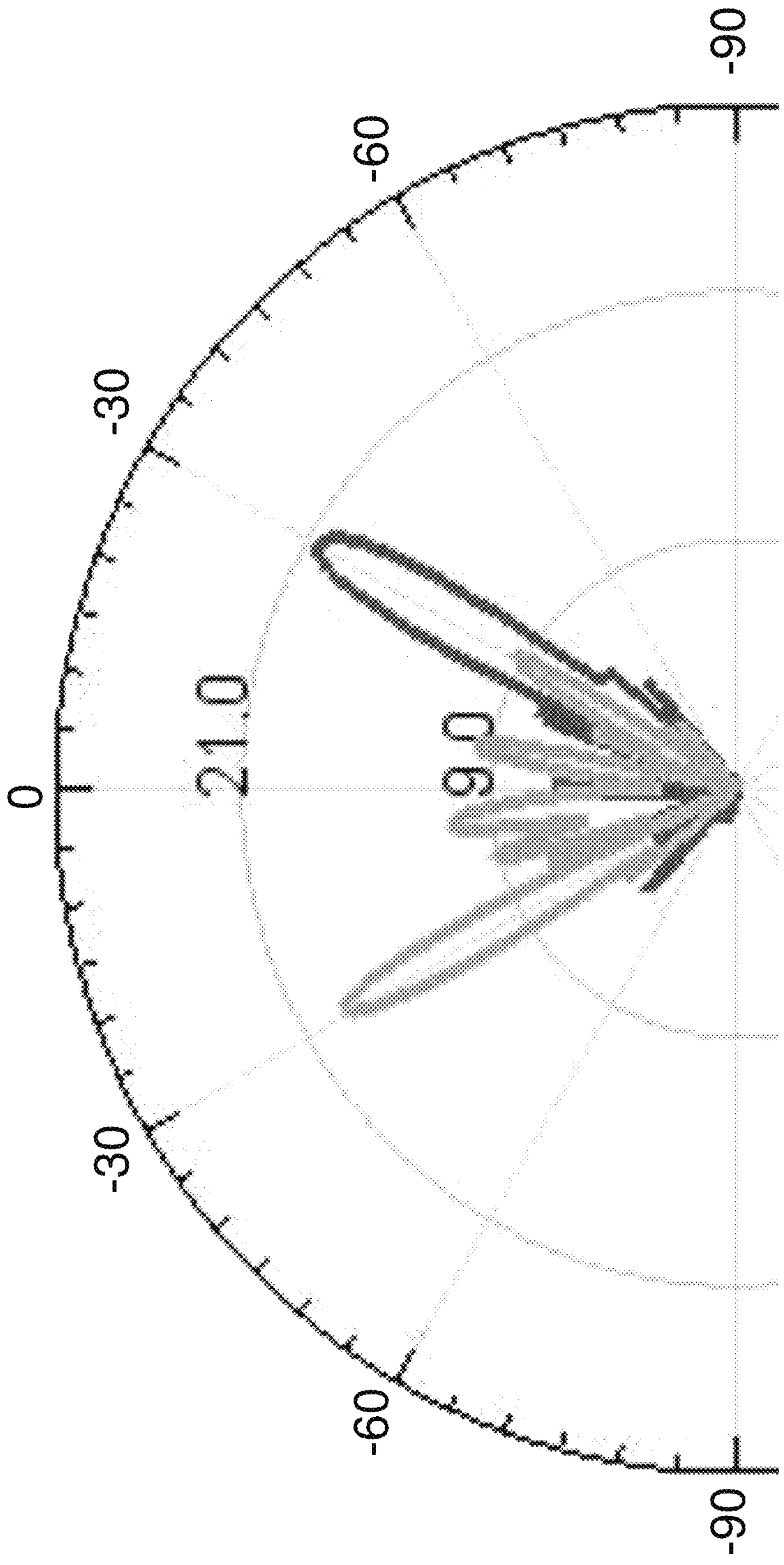
FIG. 11 is an example representation of the cross-sectional beam patterns of the surfaces of FIGS. 9A and 10A for impinging 28 GHz and 40 GHz electromagnetic waves, in accordance with various example embodiments and implementations of the subject disclosure.
Figure 12:
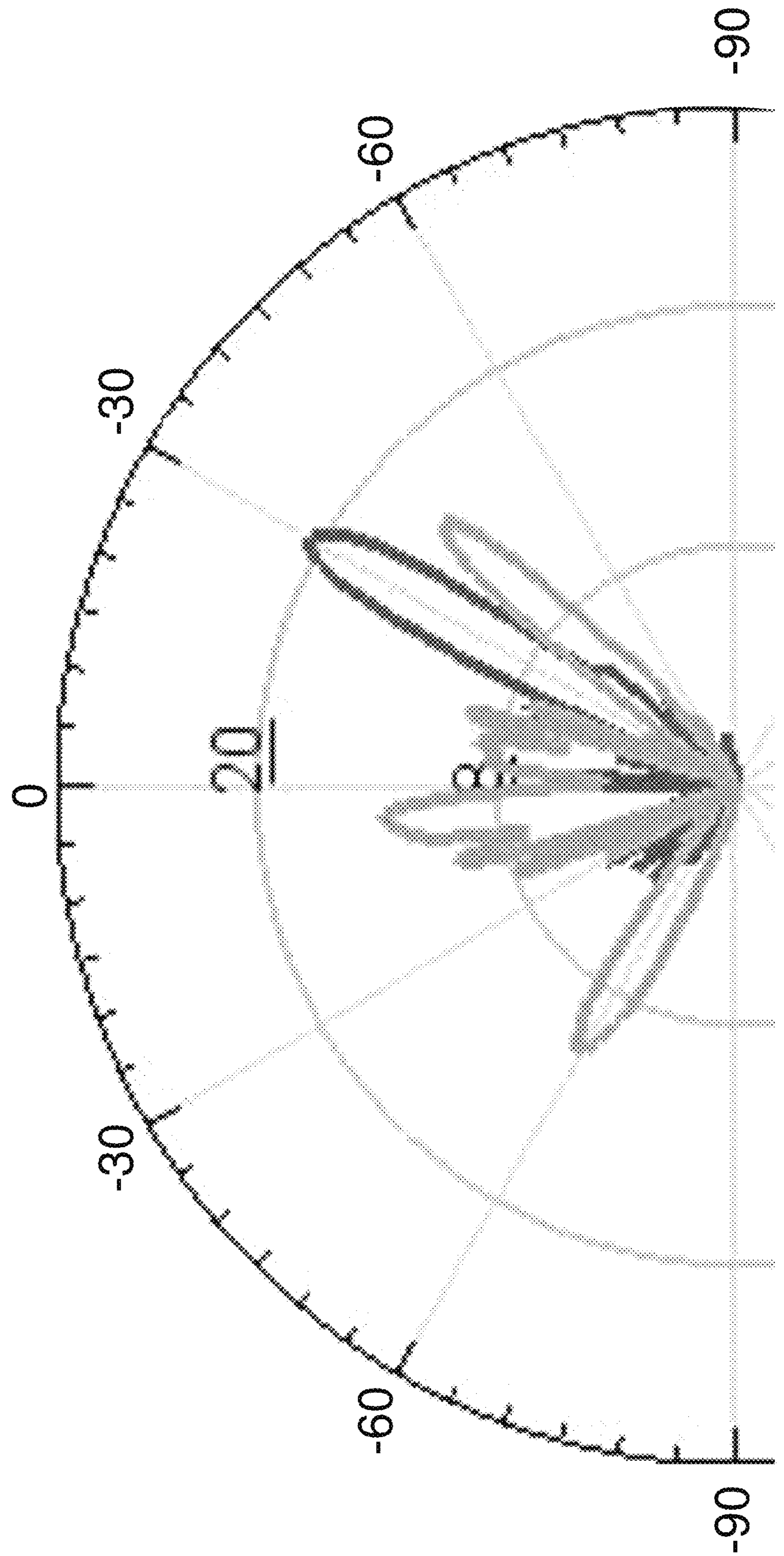
FIG. 12 is an example representation of the cross-sectional beam patterns of the surfaces of FIGS. 10A and 10B for impinging 28 GHz and 40 GHz electromagnetic waves, in accordance with various example embodiments and implementations of the subject disclosure.

As can be seen in FIGS. 11 and 12 via the lighter outlined beams, the beam steering angles of the 28 GHz (e.g., FIGS. 9A, 9B) wave are maintained the same while controlling the 40 GHz (the darker outlined beams) independently. Specifically, the first surface design 902 in FIG. 10A/FIG. 11 shows beam-steering of 40 GHz to −30 degrees and the other surface design 903 shows beam-splitting into three directions: −60, −5 and 42 degrees, with independent design control of each frequency.

Figure 13:
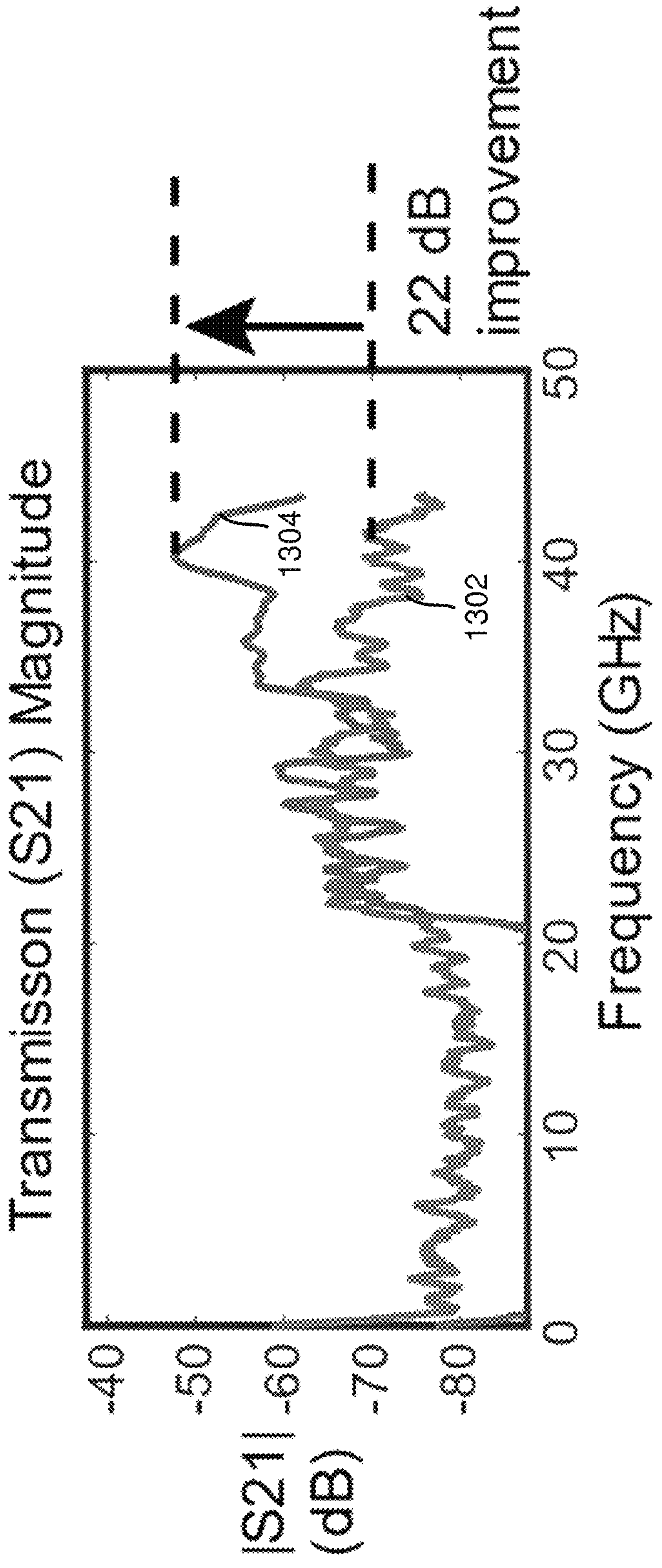
FIG. 13 is an example graphical transmission coefficient measurement result representation of a comparison between a conventional wireless communication method and the reflective surface technology described herein, in accordance with various example embodiments and implementations of the subject disclosure.

FIG. 13 graphically shows an example comparison between a conventional wireless direct transmission communication method versus indirect transmission wireless communication via the fabricated surface of FIG. 8, with a focus on addressing a significant challenge in mmWave wireless communication. The transmitted waves at various frequencies are transmitted at a 60 degree angle for both direct transmission (line 1302) to a receiving antenna, and indirect transmission, that is, impinging on the surface 802 (e.g., FIG. 8) and reflected to a receiving antenna. As can be seen at the at the design frequency of 40 GHz frequency, the use of the static reflective surface resulted in a significant 22 dB improvement in the transmitted SB21 power level. This corresponds to a 158-fold increase in the received power when employing the metasurface, and demonstrates how such a surface can mitigate some of the many limitations faced by conventional wireless communication in mmWave frequencies.

Figure 14A:
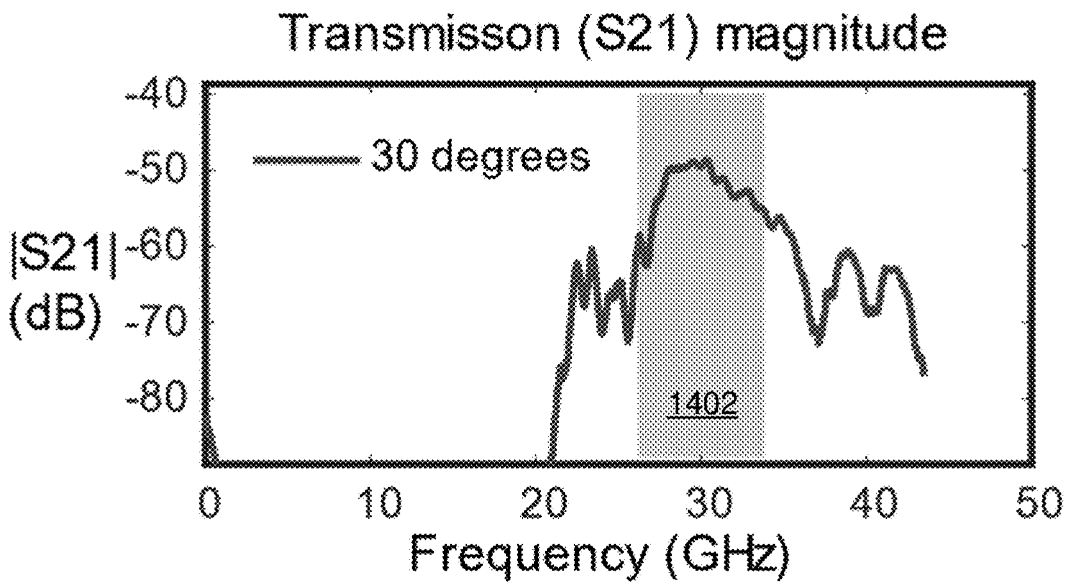
FIGS. 14A and 14B are example graphical transmission coefficient measurement result representations demonstrating beam steering at 28 GHz (FIG. 14A) and beam splitting to −60, −5, 45 degrees at 40 GHz (FIG. 14B), in accordance with various example embodiments and implementations of the subject disclosure.
Figure 14B:
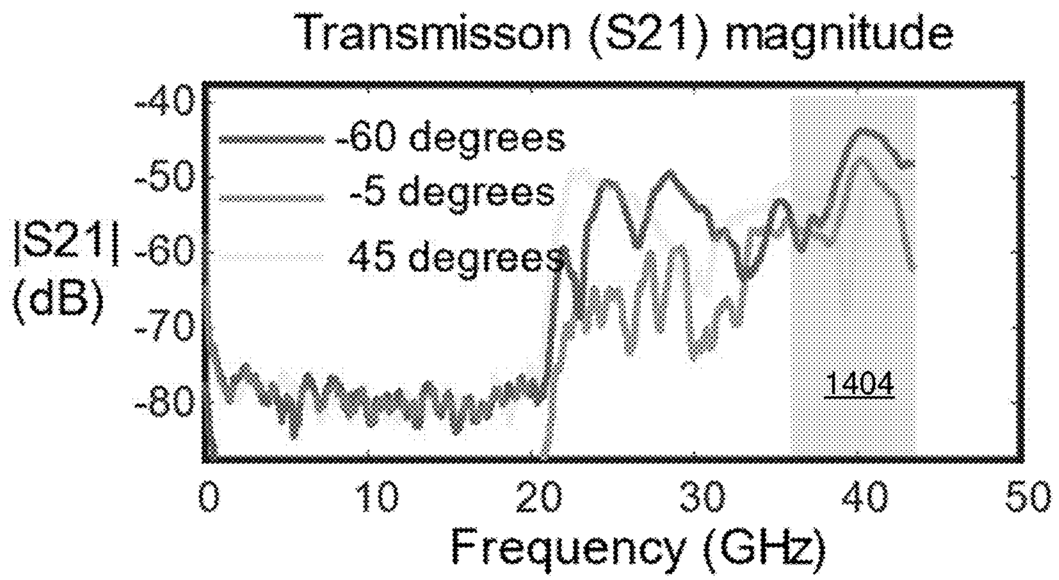

FIGS. 14A and 14B demonstrate the measured transmission coefficients at various angles, validating the significant beam-steering and beam-splitting capabilities of the technology described herein. At 28 GHz, the shaded region 1402 of FIG. 14A highlights successful beam steering, achieving a beam direction of 30 degrees. Moreover, at 40 GHz, the shaded region 1404 of FIG. 14B indicates successful beam-splitting, resulting in beams at −60, −5, and 45 degrees. The measured results confirm the efficient control of radiation patterns, allowing for independent adjustments of a reflective surface's directionality. The ability to steer and split beams via the very practical designs described herein facilitates significant adaptability in wireless communication systems, enabling enhanced coverage and improved signal reception for specific target areas. The achieved performance demonstrates the ability of a designed system in addressing challenging scenarios where flexible beam control is needed for optimizing communication links and overcoming obstructions or interference. FIG. 12, previously described, shows the radiation patterns of the different frequencies.

The table below addresses how the (single substrate layer) technology described herein overcomes some of the significant existing problems with prior technologies, e.g., a six-substrate layer solution. Specifically, the technology described herein design is more cost-efficient and space-efficient compared to existing commercially available technologies, such as phased array antennas and parabolic antennas. Compared to the latest research on existing antenna solutions, it can be seen from the table below that the technology described herein offers both higher performance and a lower cost.

| | Design of Technology Described Herein | Prior Dual-Band Example | Comments |
|---|---|---|---|
| Number of substrate layers | 1 | 6 | The lower number of layers indicates a lower complexity and cost |
| Side lobe level | <10 dB | 3 dB | The lower side lobe level indicates a worse performance. Specifically, higher power waste to unintended direction |
| Scan range (deg) | >45 | 24 | The lower scan range indicates a worse performance. |
| Average loss (dB) | 0.75 | 3 | The lower loss indicates a higher power efficiency |

By way of usage examples, consider an office setting, in which a dual-band static reflective surface with beam-splitting capabilities can significantly improve wireless communication performance and user experience. One such application is to provide reliable and high-speed internet connectivity throughout the office space. in general, office environments can create challenges in wireless communication that can lead to inconsistent coverage and suboptimal performance; for example, physical obstacles such as walls, furniture, and metal structures can block or weaken wireless signals, creating areas with poor or no connectivity, commonly referred to as “dead zones.” This can result in frustrating experiences for employees who rely on stable internet connections to perform their tasks efficiently. Additionally, the ever-increasing number of wireless devices in the office, including smartphones, laptops, tablets, and IoT devices, can lead to interference and congestion on the wireless network, while data-intensive applications and streaming services put a strain on available bandwidth. Conventional wireless communication methods, which rely solely on traditional access points, may struggle to address these challenges effectively. In such scenarios, one or more dual-band static reflective surfaces with beam-splitting capabilities can be strategically deployed such that the beam splitting allows for precise control of the electromagnetic waves. The static reflective surfaces can be positioned to redirect and focus the wireless signals towards specific areas that require, or otherwise benefit from, improved coverage, effectively overcoming signal blockages and mitigating interference.

For instance, with beam splitting, a dual-band reflective surface can ensure that both the 2.4 GHz and 5 GHz frequency bands are more optimally utilized to increase coverage and data throughput. The 2.4 GHz band can be directed towards open areas, providing broad coverage for general internet usage, while the 5 GHz band can be focused on high-traffic regions such as meeting rooms or workstations, ensuring fast and stable connections for bandwidth-intensive tasks. Moreover, a dual-band reflective surface offers the advantage of simplicity and cost-effectiveness. The fixed configuration eliminates the need for complex reconfigurability mechanisms, making it easy to deploy and maintain. It also ensures a stable and predictable performance, eliminating potential challenges associated with real-time adjustments in a dynamic environment.

Another usage example relates to intersatellite communication links, where in satellite communication systems, a dual-band static surface can offer significant benefits, particularly with respect to addressing existing challenges related to signal interference, link stability, and bandwidth optimization. Satellite constellations are multiple satellites working in tandem to provide global coverage and seamless communication services. However, as the number of satellites in the constellation increases, so does the complexity of managing the inter-satellite links.

Existing satellite constellations often face issues with signal interference due to cross-linking between neighboring satellites. The proximity of the satellites and their high transmit power can cause interference, leading to signal degradation and reduced link stability. Furthermore, the limited bandwidth available for satellite communication can pose challenges in efficiently managing data transmission and reception among the satellites. By integrating a reflective surface within the satellite constellation, these challenges can be effectively addressed. For example, a dual-band reflective surface can be strategically positioned on the surfaces of the satellites to act as intelligent reflectors, manipulating the propagation of radio waves between satellites. By adjusting the reflection angles, the dual-band reflective surface can better optimize the inter-satellite links, minimizing interference and maximizing signal quality. Moreover, the multiband capabilities allow dynamic switching between frequency bands, better optimizing data transmission based on the specific requests or requirements of the communication links. This ensures efficient bandwidth utilization, reducing congestion and enhancing overall data throughput across the satellite constellation. Additionally, a surface can act as an intelligent signal booster, amplifying the signal power of weaker links and compensating for signal attenuation during long-distance transmissions. This enhancement in link stability and signal strength results in improved overall system performance, better data reliability, and increased data transfer rates. Furthermore, a dual-band static surface offers an advantage in terms of its simplicity and cost-effectiveness compared to reconfigurable systems. The technology described herein, providing surfaces with inherent beam-steering and frequency-tuning capabilities, offers a practical and efficient solution for improving communication links within a satellite constellation.

One or more example embodiments can be embodied in a multiband device, such as described and represented herein. The multiband device can include a first ring resonator comprising a first conductor having first dimensions, a second ring resonator comprising a second conductor having second dimensions, wherein the second dimensions are different from the first dimensions, a third ring resonator comprising a third conductor having the second dimensions, and a fourth ring resonator comprising a fourth conductor having the first dimensions. The first conductor, the second conductor, the third conductor and the fourth conductor are not in physical contact with one another, and can be distributed in a geometric pattern relative to one another. The first ring resonator and the fourth ring resonator resonate at a first resonating frequency corresponding to the first dimensions in response to a first electromagnetic wave of the first resonating frequency impinging on the multiband device, and the second ring resonator and the third ring resonator resonate at a second frequency corresponding to the second dimensions in response to a second electromagnetic wave of the second resonating frequency impinging on the multiband device.

The multiband device can form a unit cell that can have a first phase profile corresponding to the first dimensions that reflects the first electromagnetic wave of the first resonating frequency as a first beam in a first beam direction, and that can have a second phase profile corresponding to the second dimensions that reflects the second electromagnetic wave of the second resonating frequency as a second beam in a second beam direction.

The first conductor, the second conductor, the third conductor and the fourth conductor can be distributed atop a substrate on a single surface, and the multiband device can include a metallic layer beneath the substrate.

The first conductor, the second conductor, the third conductor and the fourth conductor can have substantially square shapes.

The first conductor can be diagonally arranged relative to the fourth conductor, linearly arranged relative to the second conductor and linearly arranged relative to the third conductor, the second conductor can be diagonally arranged relative to the third conductor, and linearly arranged relative to the fourth conductor, and the third conductor can be linearly arranged relative to the fourth conductor.

The multiband device can be a dual-band device with a first band corresponding to the first resonating frequency and a second band corresponding to the second resonating frequency.

The multiband device can further include a fifth ring resonator comprising a fifth conductor having third dimensions, wherein the third dimensions are different from the first dimensions and the second dimensions, a sixth ring resonator comprising a sixth conductor having fourth dimensions, wherein the fourth dimensions are different from the third dimensions, a seventh ring resonator comprising a seventh conductor having the fourth dimensions, and an eighth ring resonator comprising an eighth conductor having the third dimensions. The fifth conductor, the sixth conductor, the seventh conductor and the eighth conductor are not in contact with one another, and the fifth ring resonator and the eighth ring resonator can resonate at a third resonating frequency corresponding to the third dimensions in response to a third electromagnetic wave of the third resonating frequency impinging on the multiband device, and the sixth ring resonator and the seventh ring resonator can resonate at a fourth frequency corresponding to the fourth dimensions in response to a fourth electromagnetic wave of the fourth resonating frequency impinging on the multiband device. The geometric pattern can be a first geometric pattern, with the first conductor, the second conductor, the third conductor and the fourth conductor distributed in the first geometric pattern on a first layer of the multiband device, and the fifth conductor, the sixth conductor, the seventh conductor, and the eighth conductor can be distributed in a second geometric pattern on a second layer of the multiband device. The multiband device can be a four-band device with a first band corresponding to the first resonating frequency, a second band corresponding to the second resonating frequency, a third band corresponding to the third resonating frequency, and a fourth band corresponding to the fourth resonating frequency.

The multiband device can be a unit cell of a group of unit cells of a reflective surface. The unit cell can include a first phase profile corresponding to the first dimensions that reflects the first electromagnetic wave of the first frequency as a first beam, and a second phase profile corresponding to the second dimensions that reflects the second electromagnetic wave of the second frequency as a second beam; the first beam can constructively interfere with respective other beams of respective other unit cells, other than the unit cell, to steer a first combined beam of the first frequency in a first beam direction. The second beam can constructively interfere with respective beams of respective other unit cells, other than the unit cell, to steer a second combined beam of the second frequency in a second beam direction.

The unit cell can include a first phase profile corresponding to the first dimensions that reflects the first electromagnetic wave of the first frequency as a first beam, and a second phase profile corresponding to the second dimensions that reflects the second electromagnetic wave of the second frequency as a second beam. The first beam can constructively interfere with respective other beams of respective other unit cells, other than the unit cell, to steer a first combined beam of the first frequency in a first beam direction. The second beam can constructively interfere with respective beams of respective other unit cells, other than the unit cell, to split into at least two beams of the second frequency in at least two beam directions.

One or more example embodiments can be embodied in a unit cell, such as described and represented herein. The unit cell can include a first pair of ring resonators comprising a first conductor and a fourth conductor, the first conductor and the fourth conductor having first dimensions that determine a first resonating frequency of the first pair of ring resonators, and a second pair of ring resonators comprising a second conductor and a third conductor, the second conductor and the third conductor having second dimensions that determine a second resonating frequency of the second pair of ring resonators; the first frequency and the second resonating frequency are different from one another. On the unit cell, the first conductor can be diagonally arranged relative to the fourth conductor, linearly arranged relative to the second conductor and linearly arranged relative to the third conductor, the second conductor can be diagonally arranged relative to the third conductor, and linearly arranged relative to the fourth conductor, and the third conductor can be linearly arranged relative to the fourth conductor. The unit cell can have a first phase profile, corresponding to the first pair of ring resonators, that reflects a first electromagnetic wave at the first resonating frequency in a first direction, and can have a second phase profile, corresponding to the second pair of ring resonators, that reflects a second electromagnetic wave at the second resonating frequency in a second direction.

The first conductor, the second conductor, the third conductor and the fourth conductor can be distributed atop a substrate on a single surface, and the unit cell can include a metallic layer below the substrate.

The unit cell can be one unit cell of a group of unit cells of a reflective surface. The unit cell can be one unit cell of group of respective unit cells of a reflective surface, and the reflective surface can steer a first beam of the first frequency in a first beam direction, and can steer a second beam of the second frequency in a second beam direction.

The unit cell can be one unit cell of group of respective unit cells of a reflective surface, and the reflective surface can split beams including a first beam of the first frequency steered in a first beam direction and a second beam of the first frequency steered in a second beam direction that is different from the first beam direction.

One or more example embodiments can be embodied in a device, such as described and represented herein. The device can include a reflective surface, the reflective surface including respective unit cells arranged on a single plane, the respective unit cells including a unit cell. The unit cell can include a first pair of sub-cells comprising a first conductor and a fourth conductor, and the first conductor and the fourth conductor can have first dimensions that determine a first resonating frequency of the first pair of sub-cells. The unit cell can include a second pair of sub-cells including a second conductor and a third conductor; the second conductor and the third conductor can have second dimensions that determine a second resonating frequency of the second sub-cells; the first frequency and the second resonating frequency are different from one another. On the unit cell, the first conductor can be diagonally arranged relative to the fourth conductor, linearly arranged relative to the second conductor and linearly arranged relative to the third conductor. The second conductor can be diagonally arranged relative to the third conductor, and linearly arranged relative to the fourth conductor, and the third conductor can be linearly arranged relative to the fourth conductor. The unit cell can have a first phase profile, corresponding to the first pair of sub-cells, that reflects a first electromagnetic wave at the first resonating frequency in a first direction, and can have a second phase profile, corresponding to the second pair of sub-cells, that reflects a second electromagnetic wave at the second resonating frequency in a second direction.

The reflective surface can steer a first beam of the first frequency in a first beam direction, and can steer a second beam of the second frequency in a second beam direction.

The reflective surface can operate as a beam-splitting device to steer a first beam of the first frequency in a first beam direction, and steer a second beam of the first frequency in a second beam direction that is different from the first beam direction.

As can be seen, described herein is a highly efficient and adaptive multiband metasurface that is practical to implement and facilitates significant advancements in wireless communication systems. The metasurface is based on a unit-cell design, which can include a single layer of ring resonators for dual-band applications, or alternative design variations to accommodate multi-frequency surfaces for more than two band applications. In one straightforward implementation, a low-profile single metal unit cell layer metasurface can be constructed with beam-steering and/or beam-splitting functionality for two (or more) frequencies.

What has been described herein includes mere examples. It is, of course, not possible to describe every conceivable combination of components, materials or the like for purposes of describing this disclosure, but one of ordinary skill in the art can recognize that many further combinations and permutations of this disclosure are possible. Furthermore, to the extent that the terms “includes,” “has,” “possesses,” and the like are used in the detailed description, claims, appendices and drawings such terms are intended to be inclusive in a manner similar to the term “comprising” as “comprising” is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A multiband device, comprising:

a first ring resonator comprising a first conductor having first dimensions;

a second ring resonator comprising a second conductor having second dimensions, wherein the second dimensions are different from the first dimensions;

a third ring resonator comprising a third conductor having the second dimensions; and a fourth ring resonator comprising a fourth conductor having the first dimensions, wherein the first conductor, the second conductor, the third conductor and the fourth conductor are not in physical contact with one another, and are distributed in a geometric pattern relative to one another, wherein the first ring resonator and the fourth ring resonator resonate at a first resonating frequency corresponding to the first dimensions in response to a first electromagnetic wave of the first resonating frequency impinging on the multiband device, and wherein the second ring resonator and the third ring resonator resonate at a second frequency corresponding to the second dimensions in response to a second electromagnetic wave of the second resonating frequency impinging on the multiband device.

2. The multiband device of claim 1, wherein the multiband device forms a unit cell having a first phase profile corresponding to the first dimensions that reflects the first electromagnetic wave of the first resonating frequency as a first beam in a first beam direction, and has a second phase profile corresponding to the second dimensions that reflects the second electromagnetic wave of the second resonating frequency as a second beam in a second beam direction.

3. The multiband device of claim 1, wherein the first conductor, the second conductor, the third conductor and the fourth conductor are distributed atop a substrate on a single surface, and wherein the multiband device comprises a metallic layer beneath the substrate.

4. The multiband device of claim 1, wherein the first conductor, the second conductor, the third conductor and the fourth conductor have substantially square shapes.

5. The multiband device of claim 1, wherein the first conductor is diagonally arranged relative to the fourth conductor, linearly arranged relative to the second conductor and linearly arranged relative to the third conductor, wherein the second conductor is diagonally arranged relative to the third conductor, and linearly arranged relative to the fourth conductor, and wherein the third conductor is linearly arranged relative to the fourth conductor.

6. The multiband device of claim 1, wherein the multiband device is a dual-band device with a first band corresponding to the first resonating frequency and a second band corresponding to the second resonating frequency.

7. The multiband device of claim 1, further comprising:

a fifth ring resonator comprising a fifth conductor having third dimensions, wherein the third dimensions are different from the first dimensions and the second dimensions;

a sixth ring resonator comprising a sixth conductor having fourth dimensions, wherein the fourth dimensions are different from the third dimensions;

a seventh ring resonator comprising a seventh conductor having the fourth dimensions; and an eighth ring resonator comprising an eighth conductor having the third dimensions, wherein the fifth conductor, the sixth conductor, the seventh conductor and the eighth conductor are not in contact with one another, wherein the fifth ring resonator and the eighth ring resonator resonate at a third resonating frequency corresponding to the third dimensions in response to a third electromagnetic wave of the third resonating frequency impinging on the multiband device, and wherein the sixth ring resonator and the seventh ring resonator resonate at a fourth frequency corresponding to the fourth dimensions in response to a fourth electromagnetic wave of the fourth resonating frequency impinging on the multiband device.

8. The multiband device of claim 7, wherein the geometric pattern is a first geometric pattern, and wherein the first conductor, the second conductor, the third conductor and the fourth conductor are distributed in the first geometric pattern on a first layer of the multiband device, and wherein the fifth conductor, the sixth conductor, the seventh conductor, and the eighth conductor are distributed in a second geometric pattern on a second layer of the multiband device.

9. The multiband device of claim 8, wherein the multiband device is a four-band device with a first band corresponding to the first resonating frequency, a second band corresponding to the second resonating frequency, a third band corresponding to the third resonating frequency, and a fourth band corresponding to the fourth resonating frequency.

10. The multiband device of claim 1, wherein the multiband device comprises a unit cell of a group of unit cells of a reflective surface.

11. The multiband device of claim 10, wherein the unit cell comprises a first phase profile corresponding to the first dimensions that reflects the first electromagnetic wave of the first frequency as a first beam, and a second phase profile corresponding to the second dimensions that reflects the second electromagnetic wave of the second frequency as a second beam, wherein the first beam constructively interferes with respective other beams of respective other unit cells, other than the unit cell, to steer a first combined beam of the first frequency in a first beam direction, and wherein the second beam constructively interferes with respective beams of respective other unit cells, other than the unit cell, to steer a second combined beam of the second frequency in a second beam direction.

12. The multiband device of claim 10, wherein the unit cell comprises a first phase profile corresponding to the first dimensions that reflects the first electromagnetic wave of the first frequency as a first beam, and a second phase profile corresponding to the second dimensions that reflects the second electromagnetic wave of the second frequency as a second beam, wherein the first beam constructively interferes with respective other beams of respective other unit cells, other than the unit cell, to steer a first combined beam of the first frequency in a first beam direction, and wherein the second beam constructively interferes with respective beams of respective other unit cells, other than the unit cell, to split into at least two beams of the second frequency in at least two beam directions.

13. A unit cell, comprising:

a first pair of ring resonators comprising a first conductor and a fourth conductor, the first conductor and the fourth conductor having first dimensions that determine a first resonating frequency of the first pair of ring resonators; and a second pair of ring resonators comprising a second conductor and a third conductor, the second conductor and the third conductor having second dimensions that determine a second resonating frequency of the second pair of ring resonators, wherein the first frequency and the second resonating frequency are different from one another, wherein, on the unit cell, the first conductor is diagonally arranged relative to the fourth conductor, linearly arranged relative to the second conductor and linearly arranged relative to the third conductor, the second conductor is diagonally arranged relative to the third conductor, and linearly arranged relative to the fourth conductor, and the third conductor is linearly arranged relative to the fourth conductor, and wherein the unit cell has a first phase profile, corresponding to the first pair of ring resonators, that reflects a first electromagnetic wave at the first resonating frequency in a first direction, and has a second phase profile, corresponding to the second pair of ring resonators, that reflects a second electromagnetic wave at the second resonating frequency in a second direction.

14. The unit cell of claim 13, wherein the first conductor, the second conductor, the third conductor and the fourth conductor are distributed atop a substrate on a single surface, and wherein the unit cell comprises a metallic layer below the substrate.

15. The unit cell of claim 13, wherein the unit cell is one unit cell of a group of unit cells of a reflective surface.

16. The unit cell of claim 13, wherein the unit cell is one unit cell of group of respective unit cells of a reflective surface, and wherein the reflective surface steers a first beam of the first frequency in a first beam direction, and steers a second beam of the second frequency in a second beam direction.

17. The unit cell of claim 13, wherein the unit cell is one unit cell of group of respective unit cells of a reflective surface, and wherein the reflective surface splits beams comprising a first beam of the first frequency steered in a first beam direction and a second beam of the first frequency steered in a second beam direction that is different from the first beam direction.

18. A device, comprising:

a reflective surface, the reflective surface comprising respective unit cells arranged on a single plane, the respective unit cells comprising a unit cell, and the unit cell comprising a first pair of sub-cells comprising a first conductor and a fourth conductor, the first conductor and the fourth conductor having first dimensions that determine a first resonating frequency of the first pair of sub-cells; and a second pair of sub-cells comprising a second conductor and a third conductor, the second conductor and the third conductor having second dimensions that determine a second resonating frequency of the second sub-cells, wherein the first frequency and the second resonating frequency are different from one another, wherein, on the unit cell, the first conductor is diagonally arranged relative to the fourth conductor, linearly arranged relative to the second conductor and linearly arranged relative to the third conductor, the second conductor is diagonally arranged relative to the third conductor, and linearly arranged relative to the fourth conductor, and the third conductor is linearly arranged relative to the fourth conductor, and wherein the unit cell has a first phase profile, corresponding to the first pair of sub-cells, that reflects a first electromagnetic wave at the first resonating frequency in a first direction, and has a second phase profile, corresponding to the second pair of sub-cells, that reflects a second electromagnetic wave at the second resonating frequency in a second direction.

19. The device of claim 18, wherein the reflective surface steers a first beam of the first frequency in a first beam direction, and steers a second beam of the second frequency in a second beam direction.

20. The device of claim 18, wherein the reflective surface operates as a beam-splitting device to steer a first beam of the first frequency in a first beam direction, and steer a second beam of the first frequency in a second beam direction that is different from the first beam direction.

* * * * *